United States Patent
Hazlewood et al.

(10) Patent No.: US 7,152,899 B2
(45) Date of Patent: Dec. 26, 2006

(54) AUTOMOTIVE TRUNK PASS-THROUGH FOR RECLINING REAR SEAT

(75) Inventors: Robert Joseph Hazlewood, Ann Arbor, MI (US); Kentaro Morishita, Ann Arbor, MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 162 days.

(21) Appl. No.: 11/050,321

(22) Filed: Feb. 3, 2005

(65) Prior Publication Data

US 2006/0170233 A1    Aug. 3, 2006

(51) Int. Cl.
  *B60R 7/00* (2006.01)
  *B60N 2/44* (2006.01)

(52) U.S. Cl. .............. 296/37.16; 296/65.16; 296/24.43

(58) Field of Classification Search .......... 296/37.8, 296/37.16, 65.09, 65.16, 24.43, 65.17
See application file for complete search history.

(56) References Cited

U.S. PATENT DOCUMENTS

| | | | |
|---|---|---|---|
| 4,813,722 A | 3/1989 | Viscome et al. | 292/216 |
| 4,971,380 A | 11/1990 | Cote et al. | 296/63 |
| 5,599,054 A | 2/1997 | Butz et al. | 296/37.8 |
| 5,632,520 A | 5/1997 | Butz | 296/24.1 |
| 5,700,058 A | 12/1997 | Balagurumurthy et al. | 297/440.15 |
| 5,816,640 A | 10/1998 | Nishimura | 297/37.8 |
| 6,076,880 A | 6/2000 | Coffer et al. | 296/65.09 |
| 6,398,284 B1 | 6/2002 | Butz et al. | 296/37.15 |
| 6,484,915 B1 * | 11/2002 | Butz et al. | 224/539 |
| 6,550,849 B1 | 4/2003 | Dosdall | 296/183 |
| 6,641,212 B1 | 11/2003 | Sitzler | 297/217.3 |
| 6,742,834 B1 | 6/2004 | Merritt et al. | 296/190.11 |

FOREIGN PATENT DOCUMENTS

| | | |
|---|---|---|
| JP | 09-099759 | 4/1997 |
| JP | 2001-238761 | 9/2001 |

* cited by examiner

*Primary Examiner*—Dennis H. Pedder
*Assistant Examiner*—Melissa Black
(74) *Attorney, Agent, or Firm*—Gifford, Krass, Groh, Sprinkle, Anderson & Citkowski, P.C.

(57) ABSTRACT

An apparatus provides a pass-through between the passenger compartment and the cargo space of a vehicle. The apparatus includes a front portion, the front portion surrounding a front opening of a central aperture, and a flange extending rearward of the front portion, the flange surrounding the central aperture and defining a rear opening of the central aperture. A portion of the flange protrudes into the cargo space. The apparatus is mechanically associated with the seat so that, as the seat reclines, the apparatus moves in relation to the body of the vehicle, and the flange protrudes further into the cargo space as the seat is reclined.

18 Claims, 4 Drawing Sheets

AUTOMOTIVE TRUNK PASS-THROUGH FOR RECLINING REAR SEAT

FIELD OF THE INVENTION

This invention relates to vehicles, in particular to an apparatus providing a pass-through between a passenger compartment and a cargo space of a vehicle.

BACKGROUND OF THE INVENTION

An automobile, such as a passenger sedan, is generally provided with limited trunk space to store items. However, long items, such as lumber or skis, may not fit in the trunk. It is obviously hazardous for such long items to protrude out of an open trunk. Hence it would be useful to provide a pass-through at the rear of the passenger compartment to allow long items to extend from the trunk, through the pass-through, and into the passenger compartment.

However, simply providing a hole within a rear seat assembly may not work for a reclining rear seat. For example, the hole in a rear seat assembly will become misaligned with a corresponding hole in the body wall surrounding the trunk as the seat is reclined, so that the effective cross-sectional area of the pass-through decreases. This may damage long items extending from the trunk through to the passenger area. Hence, it would be advantageous to provide an apparatus providing a pass-through having a constant cross-section even as the seat is reclined.

SUMMARY OF THE INVENTION

An apparatus for providing a pass-through in a vehicle is described. In one example, the apparatus includes a front portion, the front portion surrounding a front opening of a central aperture, and a flange extending rearward from the front portion. The flange surrounds the central aperture and defines a rear opening of the central aperture. The vehicle has a passenger compartment, a reclining seat within the passenger compartment, and a cargo space located behind the reclining seat. The apparatus is mechanically associated with the reclining seat so that, as the seat reclines, the apparatus moves in relation to the body of the vehicle. A portion of the flange protrudes through the hole in the body wall into the cargo space, and the flange protrudes further into the cargo space as the seat is reclined.

The terms front and rear are used for convenience in relation to the normal orientation of an apparatus according to the present invention when it is mechanically associated with a reclining vehicle seat, and these terms are not intended to be limiting.

DETAILED DESCRIPTION OF THE INVENTION

An apparatus is described that provides a pass-through for a vehicle having a passenger compartment containing a reclining rear seat, and a cargo space located behind the passenger compartment. The apparatus allows long freight items placed in the cargo space to extend through an aperture into the passenger compartment.

An exemplary apparatus is securable to a seat, such as the reclining rear seat of a passenger sedan or similar vehicle. The apparatus includes an elongated front portion and a rearward-projecting flange. The front portion is elongated in a generally upwards direction, and may be concealed by an armrest when the armrest is oriented upwards. The flange encloses a central aperture having an opening within the front portion. A cargo space rearward of the seat, for example, a trunk, is typically at least partially surrounded by a body wall, and the flange protrudes through a hole in the body wall into the cargo space. As the seat is reclined, a greater portion of the flange protrudes through the hole in the body wall into the trunk.

The flange defines a central aperture having a fixed cross-section as the seat is reclined. The front opening of the central aperture, in the front portion of the apparatus, moves relative to the hole in the body wall as the seat is reclined. Hence, without the flange, a long item passed through the front opening and the hole in the body wall could be damaged as the seat is reclined.

The central aperture can provide a substantially uniform cross-sectional profile between the front opening and the rear opening, which remains unchanged as the seat reclines.

The apparatus may further include a body-side frame surrounding the hole in the body wall. The body-side frame does not move as the seat is reclined. A portion of the flange protrudes through the body-side frame into the cargo space. A door can be provided to cover the front opening of the central aperture when the door is closed.

Figure 1B:
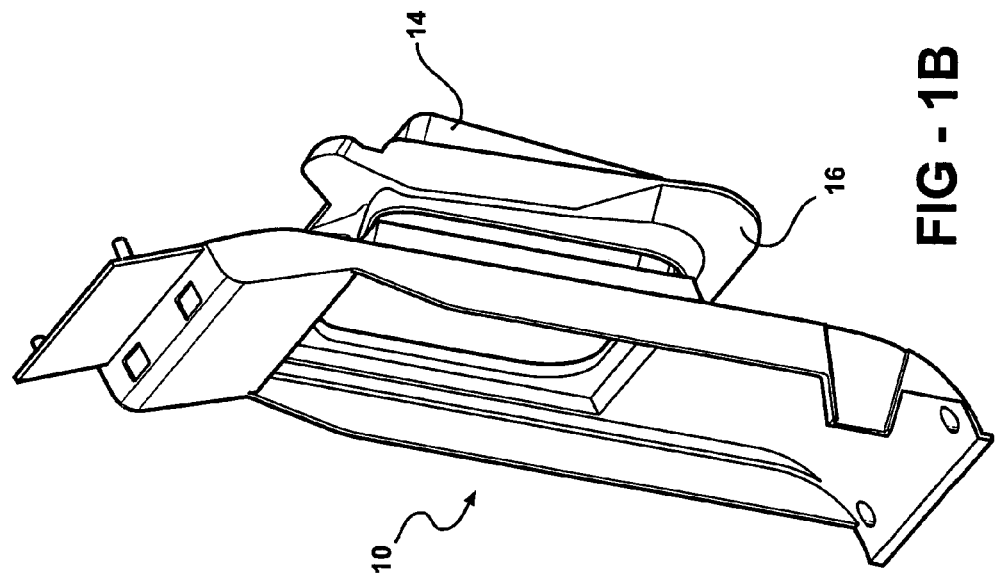
FIGS. 1A and 1B show an apparatus according to the present invention in two positions, corresponding to a seat forward position (FIG. 1A) and seat reclined position (FIG. 1B)
Figure 1A:
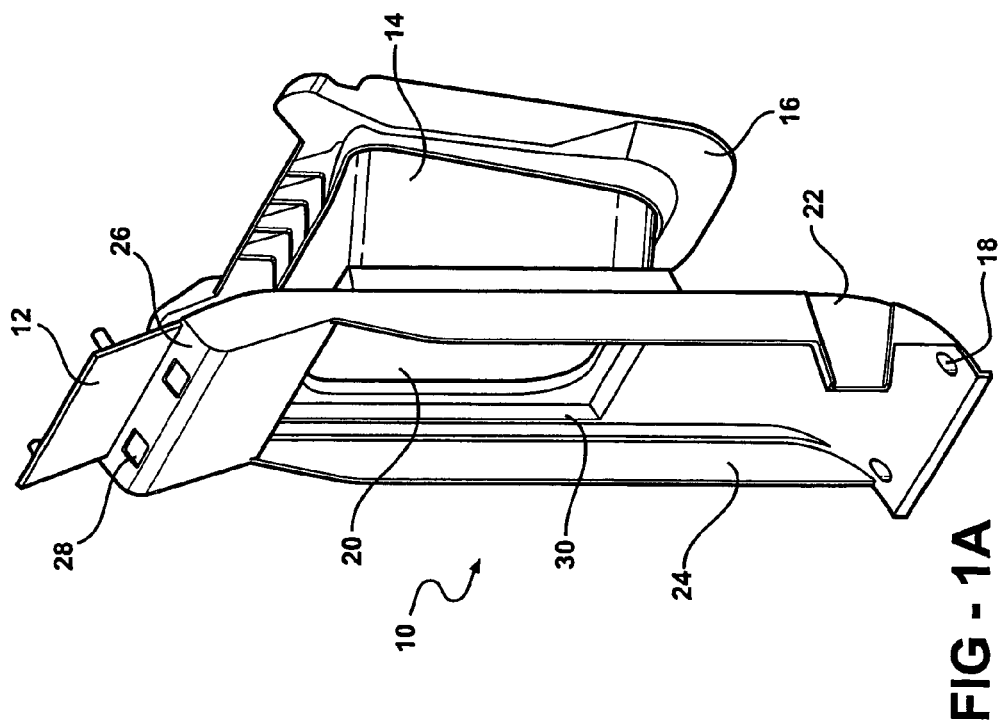

FIGS. 1A and 1B show an apparatus 10 providing a pass-through, and further shows an optional body-side frame 16. The apparatus 10 and body-side frame 16 are shown in two different relative positions, corresponding to a seat forward position (FIG. 1A) and a seat reclined position (FIG. 1B).

The apparatus 10 comprises a front portion, the front portion including upper portion 12, mounting hole 18, first sidewall 22, second sidewall 24, ledge 26, recess 28, and door frame opening 30. The apparatus 10 also includes flange 14, projecting rearward from the front portion, enclosing central aperture 20. The central aperture 20 has a front opening within the front portion, visible in the Figure, and a rear opening defined by the rear inside edge of the flange 14. The flange has a substantially rectangular interior cross-section, with rounded corners, defining a corresponding cross-sectional profile for the central aperture 20.

A portion of the flange 14 protrudes though the body-side frame 16 into the cargo space rear of the seat to which the apparatus is attached, the central aperture then having a rear opening located in the cargo space. Hence, the central aperture allows a long item to extend between the cargo space and the passenger compartment.

The apparatus is mountable to a vehicle seat so as to move rearward as the seat reclines. In relation to FIGS. 1A and 1B, in typical use the vehicle cargo space will be on the right, and a passenger compartment on the left, so that reclining the seat will tend to push the flange 14 rearward and further through the body-side frame 16.

The body-side frame 16 is a portion of the vehicle body, which provides a hole through to the trunk or other cargo space of the vehicle. In the example of a sedan-style automobile, a long item, such as a ski, may be placed in the trunk of the sedan, and extend through both of the body-side frame 16 and the apparatus 10 into the passenger compartment.

As the seat reclines, the relative positions of the apparatus 10, which is secured to the seat, and the body-side frame 16 (which is part of the vehicle body), will change. FIG. 1A shows the seat in a forward position, whereas FIG. 1B shows the seat in a reclined position. When reclined, a greater portion of the flange 14 protrudes through the body-side frame 16 into the cargo space of the vehicle.

Other flange interior cross-sections can be used, for example so as to define a circular, oval, elliptical, square, triangular, or other polygonal cross-section central aperture. The cross-sectional profile of the central aperture can be substantially constant along its length, or gentle tapering may be provided, for example with the rear opening of the central aperture being larger than the front opening. The exterior cross-section of the flange can be slightly smaller than the hole provided by the body-side frame, so as to readily project through the hole. The length of the flange can be approximately the distance backwards that the seat reclines, as measured at the height of the flange.

In the example of a sedan, when the seat is reclined, the flange extends through the body-side frame into the trunk. Other adaptations and uses are possible; for example, in a truck, sport utility vehicle, or other vehicle. An apparatus according to the present invention can provide a pass-through between a truck cab and a truck bed, between forward and rear portions of a passenger compartment, and between forward and rear portions of any vehicle, such as railroad carriages, airplanes, boats, and the like. The term cargo space is used herein generally to refer to a space rearward of the seat with which the apparatus is mechanically associated, at least part of which can be used for goods storage.

The apparatus 10 can be secured to a reclining rear seat of a passenger sedan, so that the flange protrudes through the body-side frame (or other hole in the body wall) into the trunk of the sedan. For example, the apparatus can be bolted, welded to, snapped to, or otherwise attached to a seat, or formed with a seat, at least in part, as unitary structure. The apparatus can be located between a pair of reclining seats, and attached to one of the reclining seats. A flexible surround can be provided, to avoid a trapping hazard between the front portion, which moves with the reclining seat, and other passenger compartment features which do not move with the reclining seat.

An optional door can be provided in the optional door frame opening 30, so as to conceal the front opening of the central aperture 20. This is discussed further below. The front portion can be secured to a reclining rear seat using mounting holes such as 18. For example, the apparatus can be attached to a frame extending laterally from a reclining seat, for example a frame also used to support an armrest. For example, an armrest can be provided so as to fit between the sidewalls of the apparatus 10, so as to substantially conceal the front portion. The armrest is dropped down to allow access to the central aperture 20.

Figure 2:
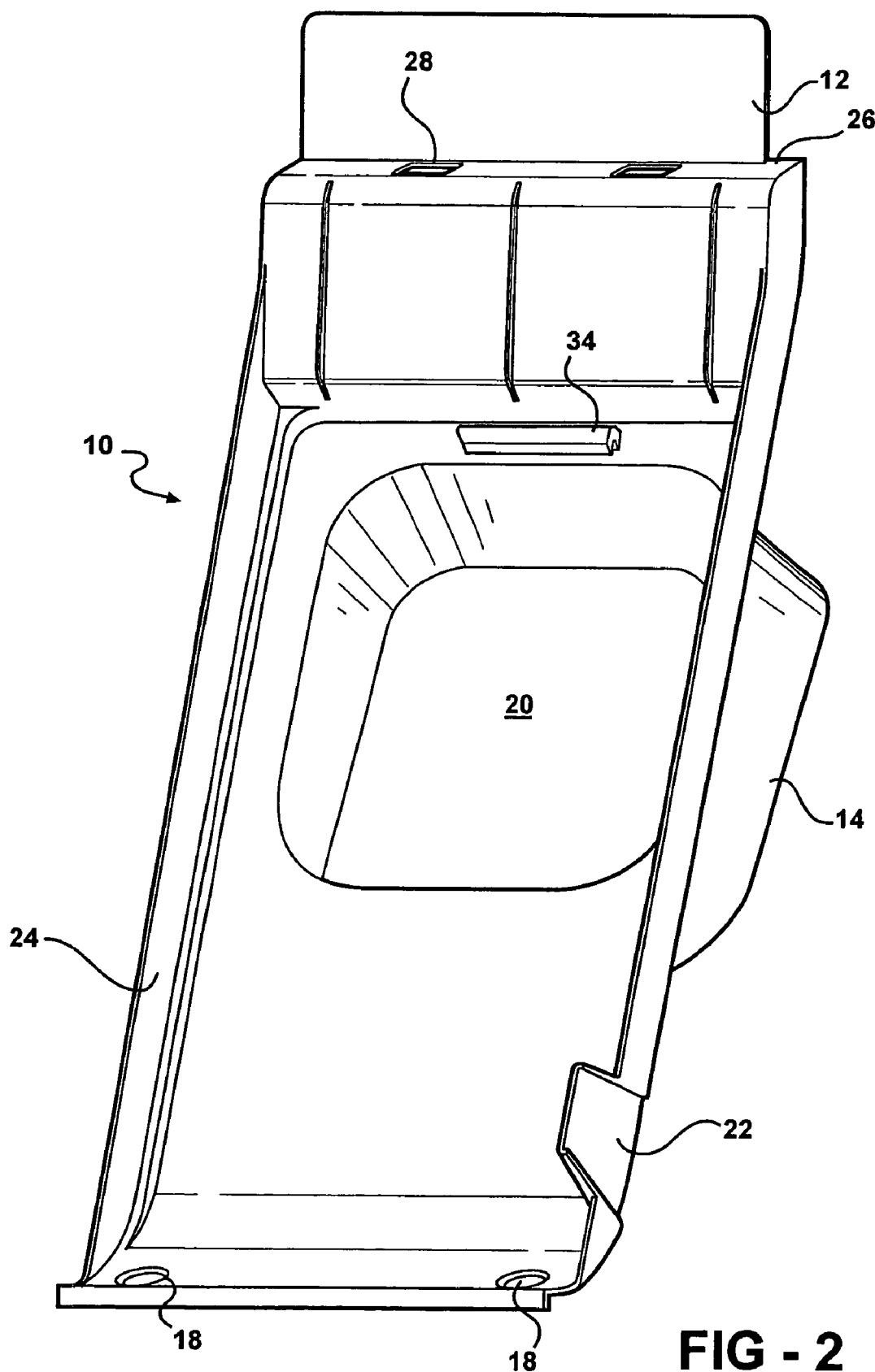
FIG. 2 shows a front view of an apparatus according to the present invention.

FIG. 2 shows another (simplified) sketch of the apparatus 10. In this view, the body-side frame is not shown. FIG. 2 illustrates a possible general location of a door handle at 34, provided so as to allow a door to be pulled down to expose the front opening of the central aperture 20. However the remaining door components are not shown for illustrative convenience, and the door configuration is discussed in more detail below.

Figure 3:
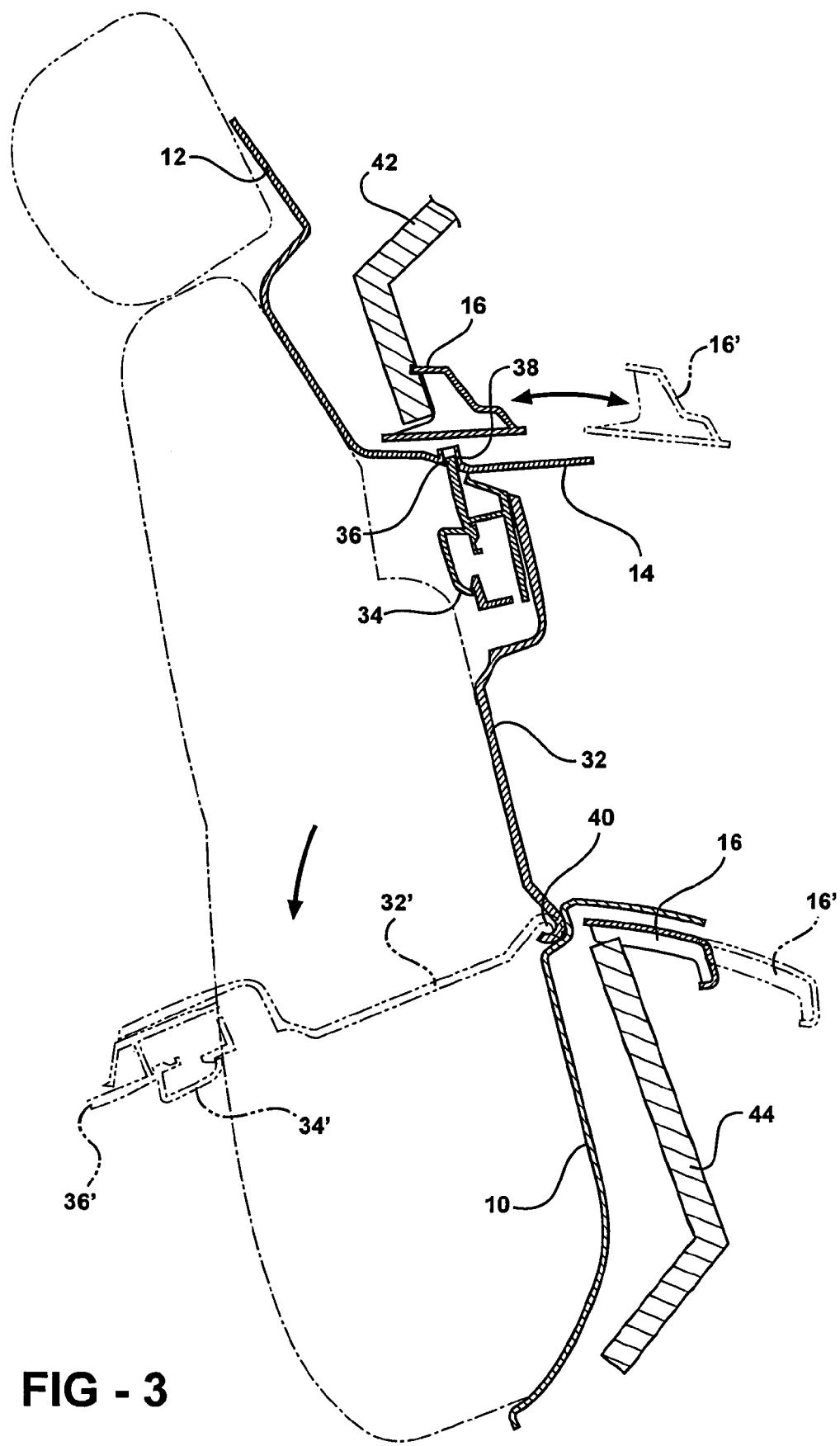
FIG. 3 shows a cross-section through the apparatus along a central vertical line, showing a pull-down door in two positions.

FIG. 3 shows a vertical cross-section through the center of the apparatus 10. The figure shows upper and lower portions of the body-side frame 16 in two positions, depicted at 16 and 16', corresponding to the relative location of the body-side frame with respect to the apparatus 10 in the seat forward and seat reclined positions, respectively.

The two locations of the body-side frame 16 illustrate the relative motion between the body-side frame 16 and the apparatus 10, though actually it is the apparatus 10 that moves relative to the vehicle body as the seat is reclined.

FIG. 3 also shows a door 32, with door handle 34, door upper portion 36, and door hinge (or other pivot apparatus) 40. The door 32 will normally be closed so as to block access between the trunk and passenger compartment. However, the door can be pulled downwards using the door handle 34 so as to expose the front opening of the central aperture 20. The door is also shown in a pulled-down position through dashed lines, as shown at 32', 34' and 36'. In the vertical position, the door can be latched by pushing door upper portion 36 into receiving slot 38.

The figure also shows pieces of silencer material 42 and 44, which can be provided for additional sound insulation between the passenger compartment and the trunk. However, the provision of silencer material is optional.

An armrest in an upright position is outlined using dashed lines in FIG. 3. The armrest will normally hide the door 32 when the armrest is in the upright position, as viewed from the passenger compartment. To configure the apparatus as a pass-through, the armrest is pulled down to reveal the door 32, the door itself then being pulled down to allow access through central aperture 20 and into the cargo space of the vehicle, which would be on the right using the orientation of FIG. 3.

Figure 4:
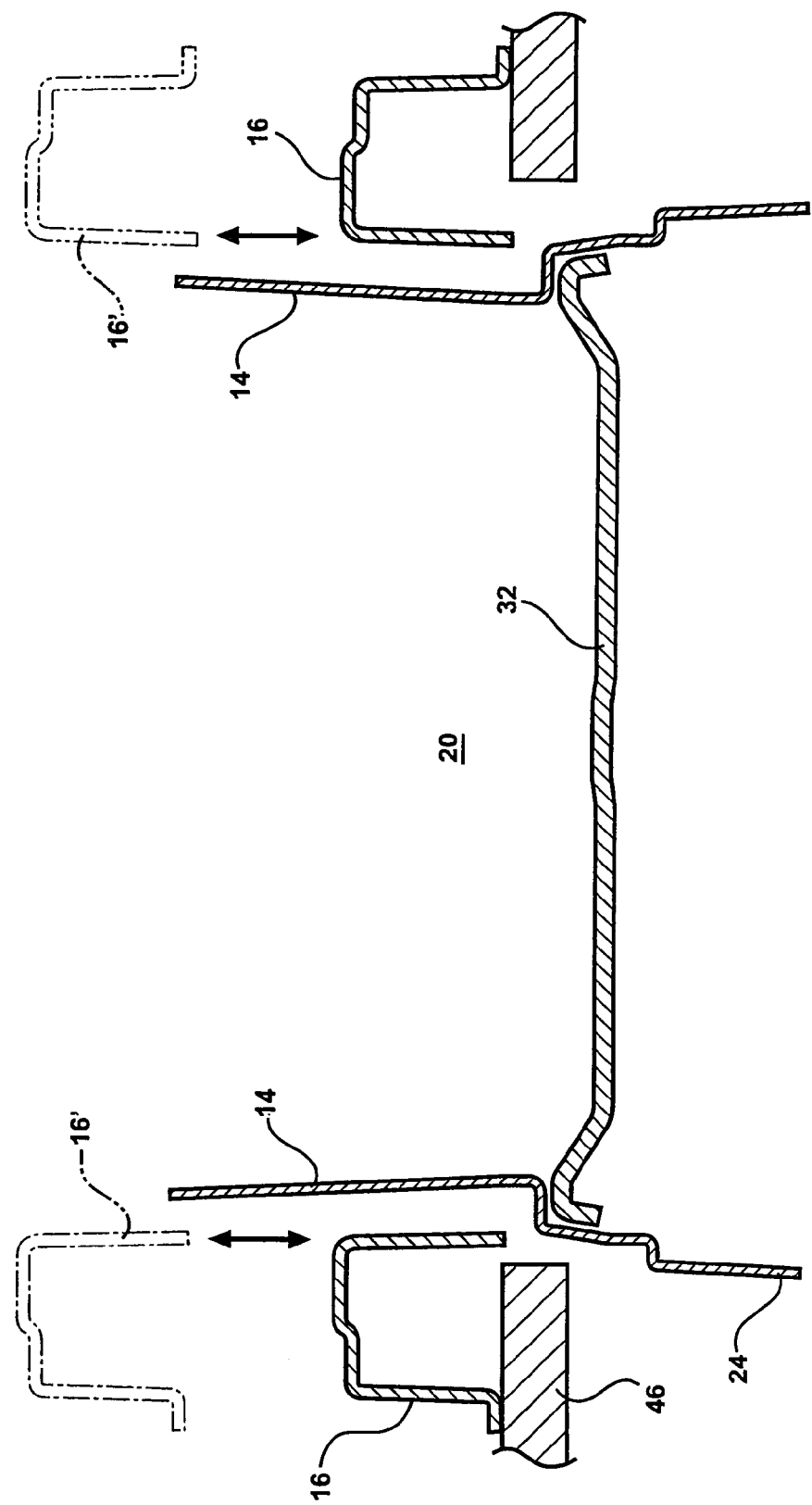
FIG. 4 shows a cross-section horizontally through the center of an apparatus according to the present invention.

FIG. 4 shows a horizontal cross-section through the center of the apparatus 10, showing portions of the body-side frame 16 in two positions labeled 16 and 16'. The two positions correspond to the different relative positions of the body and the apparatus as the seat is reclined, the flange 14 and a sidewall 24 of the front portion of the apparatus being indicated in the Figure. As discussed above in relation to FIG. 3, in actuality, it is the apparatus that moves relative to the body-side frame 16.

The figure shows the door 32 in an upright position, the front opening of the central aperture 20 being concealed from the passenger compartment by the door 32. The figure also shows portions of the flange 14 that protrude through the body-side frame 16 with the seat in the reclined position. The figure also shows a piece of optional silencer material 46, as discussed above in relation to FIG. 3.

Hence, an improved apparatus for providing a pass-through for a reclining rear seat comprises a front portion, having a front opening of an aperture, and a flange surrounding the aperture and providing a rear opening of the aperture through to the cargo space of the vehicle. The flange protrudes through an optional body-side frame. An advantage of this configuration is that the cross-section of the central aperture, used to provide the pass-through, does not change as the seat is reclined, as the cross-section of the pass-through is defined by the flange. Generally, the body-side frame will provide a hole slightly greater in cross-sectional area than the outside dimensions of the flange, so as to allow the flange to protrude through the hole in the body-side frame.

Hence, an apparatus for allowing long items stowed in a rear cargo space of a vehicle to extend through into a passenger compartment comprises a front portion having attachment fixtures allowing the apparatus to be secured to a vehicle seat, and a rearward projecting tubular flange surrounding a central aperture. The central aperture has a front opening in the front portion of the pass-through, a rear opening at the rear of the flange, which may be in the cargo space. A door can be provided, concealing the front opening of the central aperture when closed, the door being hinged and swinging open so as to reveal the central aperture.

An apparatus according to the present invention can be combined with a reclining rear seat of a vehicle, such as a sedan, to provide an improved seat assembly providing a pass-through.

A seat assembly for a vehicle, the vehicle having a passenger compartment and a cargo space rear of the seat assembly, includes a reclining seat and an apparatus providing a pass-through between the passenger compartment and the cargo space. The apparatus includes a rearward projecting flange and a front portion, the flange surrounding a central aperture extending between the cargo space and the passenger compartment. The apparatus is mechanically associated with the seat so that the flange moves rearward as the seat is reclined, more of the flange protruding into the cargo space as the seat is reclined. The apparatus may further include a door covering the central aperture when the door is closed position, the central aperture being revealed by opening the door. The door may be hinged on the bottom, and downwardly swinging to open. The seat assembly may further include an armrest, the armrest largely concealing the apparatus when the armrest is in an upright position. The armrest may be a center armrest between a pair of rear seats.

In other examples, the flange may not extend completely through the body-side frame, a portion of the flange being enclosed by the body-side frame, that portion increasing as the seat is reclined.

In other examples, the flange may protrude into a recess within the cargo space, so as to reduce the possibility of damage to items stored in the cargo space as the seat is reclined. In other examples, the apparatus may be located in the back of a seat, such as attached to the seat near the center of the seat-back frame, and normally concealed by a seat-back cushion or head-rest cushion. A vehicle may contain more than one apparatus according to the present invention. For example, first and second apparatus can be provided between front and rear seats. Central apertures of multiple apparatus may be in register, so as to allow a long item to project through a plurality of central apertures.

Apparatus according to the present invention may also be provided between the reclining seats of auditoria and the like, and the central apertures used to pass items through from one row of seats to another.

The apparatus may be formed from materials including metal, plastic, or any suitable material.

An improved vehicle comprises a passenger compartment, a rear reclining seat located towards the rear of the passenger compartment, a cargo space located behind the rear seat, a body wall at least partially separating the passenger compartment and the cargo space, and an apparatus according to the present invention providing a pass-through between the cargo space and the passenger compartment. For example, the apparatus can have a front portion secured to the rear seat, and flange surrounding a central aperture, the flange extending through to the cargo space and being rigid so that the central aperture provides a constant cross-section as the seat is reclined.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference.

Having described our invention, we claim:

1. An apparatus for providing a pass-through in a vehicle, the vehicle having a passenger compartment, a seat having a reclining capability located within the passenger compartment, and a cargo space located rear of the passenger compartment, the cargo space being at least partially surrounded by a body wall having a hole therein, the pass-through allowing long items placed in the cargo space to extend into the passenger compartment, the apparatus comprising:

a front portion; and a flange extending rearward of the front portion, the flange surrounding a central aperture, the central aperture having a front opening within the front portion, and a rear opening defined by the flange, the apparatus being mechanically associated with the seat so as to move rearward as the seat reclines, a portion of the flange protruding into the cargo space though the hole in the body wall when the seat is reclined.

2. The apparatus of claim 1, wherein the central aperture has a rear opening in the cargo space.

3. The apparatus of claim 1, wherein the portion of the flange protruding though the hole in the body wall increases as the seat is reclined.

4. The apparatus of claim 1, wherein the front portion is attached to the seat.

5. The apparatus of claim 3, wherein the central aperture has a substantially uniform cross-sectional profile between the front opening and the rear opening.

6. The apparatus of claim 5, wherein the substantially uniform cross-sectional profile of the central aperture remains unchanged as the seat reclines.

7. The apparatus of claim 1, further including a body-side frame, the body-side frame surrounding the hole in the body wall, the portion of the flange protruding into the cargo space extending through the body-side frame.

8. The apparatus of claim 1, further comprising a door, the door having a closed position covering the front opening of the central aperture, and an open position revealing the front opening of the central aperture.

9. An apparatus for providing a pass-through in a vehicle, the vehicle having a passenger compartment, a seat having a reclining capability located within the passenger compartment, and a cargo space located rear of the passenger compartment, the cargo space being at least partially surrounded by a body wall having a hole therein, the pass-through allowing long items placed in the cargo space to extend into the passenger compartment, the apparatus comprising:

a front portion, the front portion surrounding a front opening of a central aperture; and a flange surrounding the central aperture and defining a rear opening of the central aperture, the apparatus being attached to the seat so that the apparatus moves in relation to the body wall as the seat reclines, a portion of the flange protruding into the cargo space through the hole in the body wall when the seat is reclined.

10. The apparatus of claim 9, wherein the vehicle is a passenger sedan, the seat is a reclining rear seat, and the cargo space is a trunk space, the apparatus providing a pass-through between the trunk space and the passenger compartment.

11. The apparatus of claim 9, the apparatus being located between the seat and a second seat, the seat and second seat being located in the rear of the passenger compartment.

12. The apparatus of claim 9, the apparatus being attached to the seat by mounting hardware using mounting holes in the front portion.

13. The apparatus of claim 9, the front portion being concealed by an armrest adjacent to the seat when the armrest is in an upright position, the front portion being revealed when the armrest is in a dropped down position.

14. A seat assembly for a vehicle, the vehicle having a passenger compartment and a cargo space, the seat assembly being located in the passenger compartment, the cargo space being rear of the seat assembly, the seat assembly including:

a reclining seat; and an apparatus providing a pass-through between the passenger compartment and the cargo space, the apparatus including a front portion and a flange projecting rearward from the front portion, the flange surrounding a central aperture between the cargo space and the passenger compartment, the apparatus being secured to the seat so that the flange moves rearward as the seat is reclined.

15. The seat assembly of claim 14, wherein the apparatus further includes a door, the door covering the central aperture when the door is in a closed position, the central aperture being revealed by opening the door.

16. The seat assembly of claim 14, wherein the door is a downwardly swinging door.

17. The seat assembly of claim 14, further including an armrest, the armrest concealing the apparatus when the armrest is in an upright position.

18. The seat assembly of claim 17, wherein the flange has a substantially rectangular cross-section, and the front portion is elongated so as to substantially match a profile of the armrest when the armrest is in the upright position.

* * * * *